United States Patent
Diaz et al.

[11] Patent Number: 6,149,839
[45] Date of Patent: Nov. 21, 2000

[54] CATION-TREATED SILICATE PHOSPHOR

[75] Inventors: Anthony L. Diaz, Athens; Charles F. Chenot, Towanda, both of Pa.; Shelley A. Sonner, Big Flats, N.Y.

[73] Assignee: Osram Sylvania Inc., Danvers, Mass.

[21] Appl. No.: 09/322,542

[22] Filed: May 28, 1999

Related U.S. Application Data

[60] Provisional application No. 60/087,926, Jun. 4, 1998.

[51] Int. Cl.[7] ............... C09K 11/02; C09K 11/59; H01J 61/00

[52] U.S. Cl. ............... 252/301.4 F; 252/301.6 R; 313/485; 313/486; 313/635

[58] Field of Search ............... 252/301.4 F, 301.6 F; 313/486, 635, 485

[56] References Cited

U.S. PATENT DOCUMENTS 5,695,685  12/1997  Chau ................ 252/301.6 F

*Primary Examiner*—C. Melissa Koslow
*Attorney, Agent, or Firm*—Robert F. Clark

[57] ABSTRACT

A cation-treated silicate phosphor and fluorescent lamp made therefrom are provided wherein the 100 hour radiance maintenance is significantly improved. The cation treatment method involves adding an amount of a silicate phosphor to a salt solution containing a cation wherein the ratio of cation to phosphor in the solution is from about 1:2 to about 4:1 moles of cation to moles of phosphor. The solution is then stirred for a time sufficient to cause the cation to attach to the phosphor surface to form a cation-treated phosphor. The cation-treated phosphor is separated from the solution and annealed at a temperature and for a time sufficient to increase radiance maintenance of the cation-treated phosphor.

20 Claims, 4 Drawing Sheets

CATION-TREATED SILICATE PHOSPHOR

CROSS-REFERENCE TO RELATED APPLICATION

This application claims the benefit of U.S. Provisional Application No. 60/087,926, filed Jun. 4, 1998.

TECHNICAL FIELD

This invention relates to silicate-based phosphors, and especially to lead-activated $BaSi_2O_5$, used in fluorescent lighting applications. More particularly, it relates to a cation enrichment of the surface of the phosphor particle, which allows for improved maintenance of the phosphor in a fluorescent lamp.

BACKGROUND OF THE INVENTION

Lead-activated $BaSi_2O_5$ ($BaSi_2O_5$:Pb)is used as the long-wavelength UV (347 nm) phosphor in fluorescent suntanning lamps. Its preparation and use have been described in U.S. Pat. Nos. 2,597,631, 3,043,781, and 5,234,625. A well-known problem with the use of this material is that its radiance maintenance in a fluorescent lamp is poor relative to other fluorescent lamp phosphors. That is, suntanning lamps employing the $BaSi_2O_5$:Pb phosphor exhibit a relatively large decrease in radiant output over time. The reasons for the poor radiance maintenance of this material are still not well understood. It has been demonstrated generally that the maintenance of certain phosphors may be improved by modifying the phosphor surface or applying a protective coating. In particular, U.S. Pat. No. 5,695,685 describes the application of an ion-exchange treatment to a variety of lamp phosphors. However, the improvement in lamp maintenance is only about 2% and no examples are provided of the successful application of the method to $BaSi_2O_5$:Pb phosphor. In other prior art, U.S. Pat. No. 5,223,341 describes a conformal $Al_2O_3$ coating formed by an MOCVD technique which increases the radiance maintenance of a $BaSi_2O_5$:Pb phosphor at 100 hours of lamp operation from 75–85% up to 90–95%. However, the method of application of the coating by MOCVD techniques generally is more expensive than solution based methods. Thus, it would be an advantage to have a solution based method which would produce a significant improvement in lamp maintenance.

SUMMARY OF THE INVENTION

It is an object of the invention to obviate the disadvantages of the prior art.

It is another object of the invention to provide a solution based method for significantly improving the lamp maintenance of silicate-based phosphors.

It is a further object of the invention to significantly improve the 100 hour radiance maintenance of a fluorescent lamp containing a $BaSi_2O_5$:Pb phosphor.

In accordance with one aspect of the invention, there is provided a method for preparing a cation-treated silicate phosphor. The method involves adding an amount of a silicate phosphor to a salt solution containing a cation, the ratio of cation to phosphor in the solution being from about 1:2 to about 4:1 moles of cation to moles of phosphor, stirring the solution for a time sufficient to cause the cation to attach to the phosphor surface to form a cation-treated phosphor, separating the cation-treated phosphor from the solution, and annealing the cation-treated phosphor at a temperature and for a time sufficient to increase radiance maintenance of the cation-treated phosphor.

In accordance with another aspect of the invention, there is provided a fluorescent lamp having a phosphor layer containing a cation-treated $BaSi_2O_5$:Pb phosphor and having a maintenance of at least about 82%.

In accordance with yet another aspect of the invention, there is provided a fluorescent lamp having a phosphor layer containing a $BaSi_2O_5$:Pb phosphor having a cation-treatment, the fluorescent lamp having a maintenance which is at least about 4% greater than a similar fluorescent lamp having a phosphor layer containing the same $BaSi_2O_5$:Pb phosphor without the cation treatment.

DESCRIPTION OF THE PREFERRED EMBODIMENTS

Figure 1:
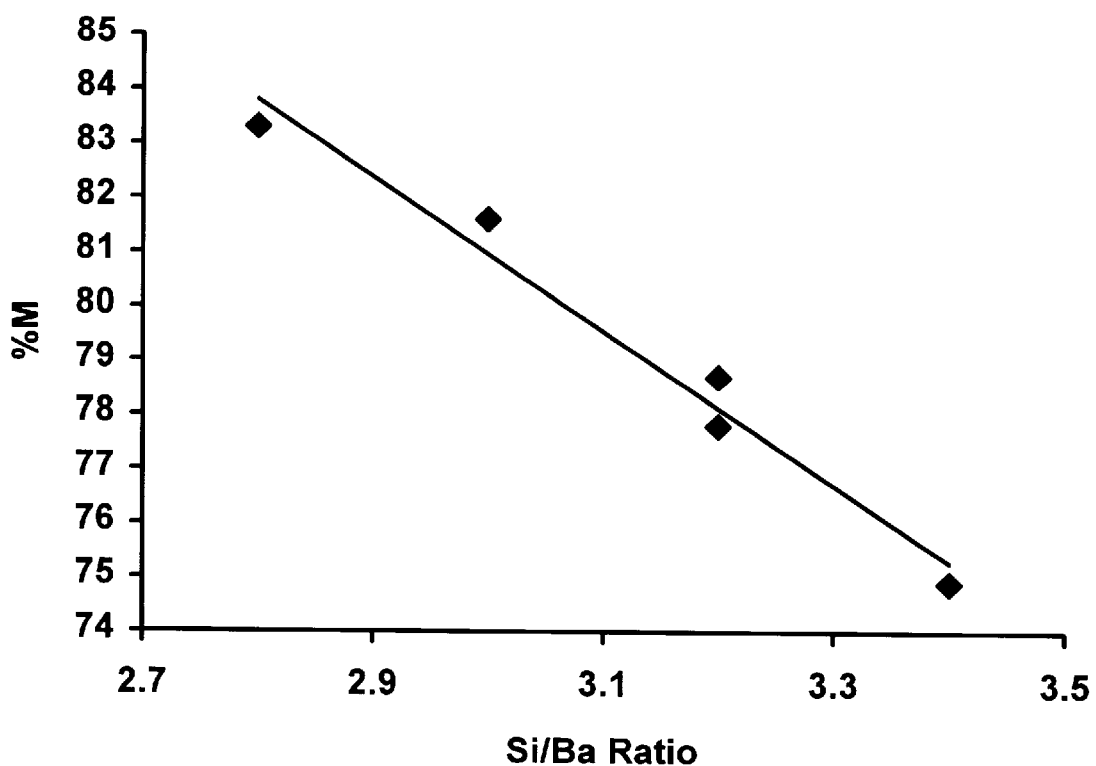
FIG. 1 is a graphical representation of the maintenance of fluorescent lamps incorporating a cation-treated $BaSi_2O_5$:Pb phosphor as a function of the ratio of silicon to barium surface atoms.

For a better understanding of the present invention, together with other and further objects, advantages and capabilities thereof, reference is made to the following disclosure and appended claims taken in conjunction with the above-described drawings.

This invention can be applied to solid-state silicate phosphors that have been previously prepared by any synthetic technique. In particular, we describe the application of this treatment to Pb-activated $BaSi_2O_5$ phosphor that has been previously prepared by conventional solid state synthetic methods, and exhibits luminescence characteristics suitable for application in suntanning lamps. The treatment is applied by first stirring the phosphor in a salt solution, e.g. $BaCl_2$, $Sr(NO_3)_2$. The material is then filtered, dried, and is followed by an annealing step. The annealing step dramatically improves the retention of the cations at the phosphor surface. Phosphors treated in this way exhibit improved maintenance of their initial radiant output during operation of a lamp.

PHOSPHOR PREPARATION

The present invention can be applied to Pb-activated barium disilicate phosphor ($BaSi_2O_5$:Pb) prepared by any means. The treatment is applied by stirring the phosphor in a salt solution containing 0.5 to 2 moles/liter cation, in a ratio of about 1:2 to about 4:1 moles of cation to moles of phosphor. The pH of the solution may be adjusted to about 9 to promote ion exchange. Mixing can be carried out at any reasonable solution temperature for times of about 60 minutes or more. Following mixing, the solution is filtered and the resulting cake is dried. The cation-treated phosphor is then annealed at temperatures from about 700° C. to about 1000° C. for about 2 to about 7 hours. This heat treatment has been found to greatly enhance the lamp performance of these phosphors compared to phosphor that had not heat-treated. The resulting phosphor, after washing with water and drying, is ready for use in a fluorescent lamp.

The following non-limiting examples are presented. In each of the examples, the phosphor used in the treatment was $BaSi_2O_5:Pb$, Type 2011C, manufactured by OSRAM SYLVANIA Products Inc. However, it is expected that other silicate-based phosphors may be treated by the process described herein.

EXAMPLE 1

400g of $BaSi_2O_5:Pb$ phosphor was mixed in 4.0 liter of 1M $BaCl_2$ solution for 2 hours at room temperature. The cation-treated phosphor was filtered and dried overnight at 130° C. Following drying, the cation-treated phosphor was annealed in an open silica crucible at 800° C. for four hours. The resulting cakes were water washed to low conductivity and dried. The finished phosphor was then incorporated into fluorescent lamps for testing.

EXAMPLE 2

The phosphor in this example was prepared exactly as in Example 1, except that the annealing was done for 5 hours at 950° C.

EXAMPLE 3

400g $BaSi_2O_5:Pb$ phosphor was mixed in 4.0 l of 0.5M $Sr(NO_3)_2$ solution for 2 hours at room temperature. Following this, the cation-treated phosphor was processed exactly as in Example 1.

The surface compositions of the cation-treated phosphors prepared in the above examples are compared to that of the untreated phosphor in Table 1. The surface compositions were measured using ESCA (electron spectroscopy for chemical analysis). An increase in the surface cation concentration is evidenced by an increase in the percentage of Ba or Sr atoms on the treated samples. For $BaSi_2O_5:Pb$ phosphor treated with barium cations, it is preferred that the ratio of silicon to barium surface atoms be 3.0 or less. The lamp performance of these phosphors are compared in Table 2. In the table, maintenance (%M) is defined as the 100 hour radiance divided by the 0 hour radiance. The difference in 100 hour radiant output relative to the untreated phosphor (Δ 100 Hr.) is also shown. Example 3 was tested separately from Examples 1 and 2, and so was tested against a different standard. The phosphors treated in accordance with the present invention exhibit a significant improvement in 100-hour radiance, as well as in radiance maintenance, with little or no loss of initial radiant output. In general, an improvement in maintenance of at least about 4% has been demonstrated (Example 1) and in particular an improvement in maintenance of at least about 8% has been demonstrated (Examples 2 and 3).

TABLE 1

Surface Compositions of Cation-Treated $BaSi_2O_5:Pb$ Phosphors

| Sample | Atomic Composition of Surface (atom %) | | | |
| --- | --- | --- | --- | --- |
| | Ba | Si | Pb | Sr |
| Example 1 | 6.9 | 22 | 0.1 | not detected |
| Example 2 | 7.5 | 21 | <0.1 | not detected |
| Example 3 | 5.9 | 18 | 0.3 | 3.1 |
| untreated phosphor | 6.2 | 21 | 0.2 | not detected |

TABLE 2

Lamp Performance of Cation-Treated $BaSi_2O_5:Pb$

| Sample | 0 hr. radiance | 100 hr. radiance | Δ 100 hr. | % M |
| --- | --- | --- | --- | --- |
| Example 1 | 18144 | 14113 | +529 | 77.8 |
| Example 2 | 18486 | 15404 | +1820 | 83.3 |
| untreated phosphor | 18143 | 13584 | — | 74.9 |
| Example 3 | 17728 | 14938 | +734 | 84.3 |
| untreated phosphor | 18219 | 14204 | — | 78.0 |

Lamp maintenance data from a single lamp series incorporating Ba-treated $BaSi_2O_5:Pb$ phosphors was compiled and is shown in FIG. 1. In this series, the $BaCl_2$ concentration and the post-wash annealing conditions were varied. Surface atom concentrations of the cation-treated phopshors were determined by ESCA. Referring to FIG. 1, maintenance (%M) is shown as a function of the ratio of silicon to barium atoms present on the surface of the cation-treated phosphor. The data presented clearly demonstrates that increasing the surface Ba content (decreasing the Si/Ba ratio) leads to an improvement in 100 hour maintenance of the lamp.

Figure 2:
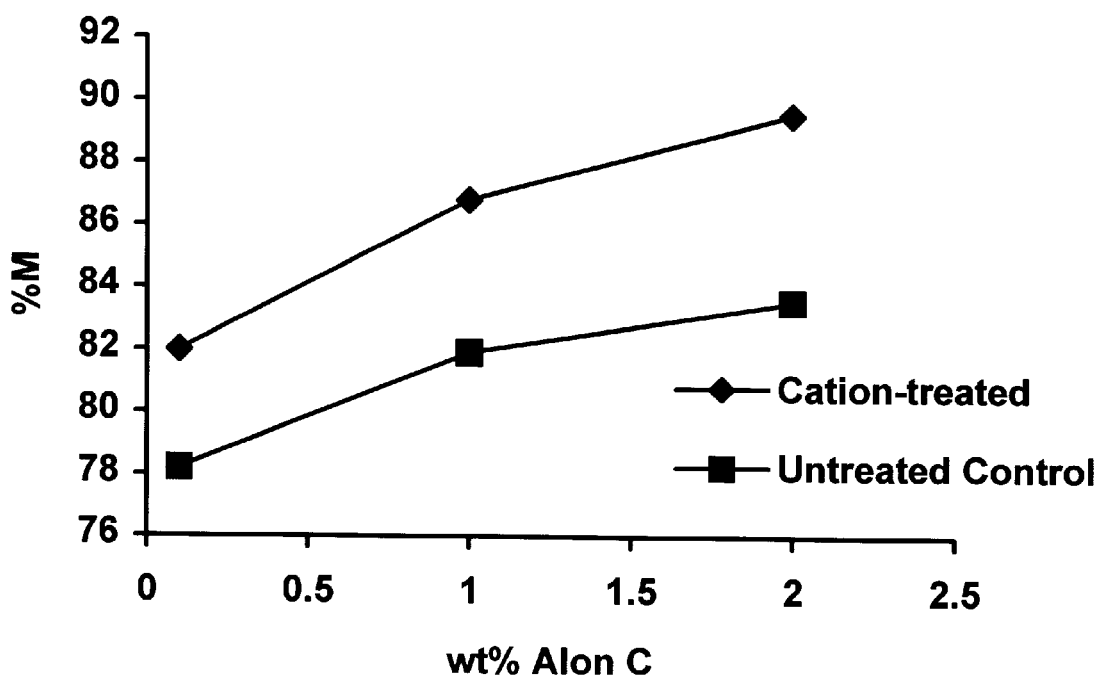
FIG. 2 is a graphical representation of the maintenance of fluorescent lamps incorporating a cation-treated $BaSi_2O_5$:Pb phosphor as a function of the amount of Alon C blended with the phosphor.
Figure 3:
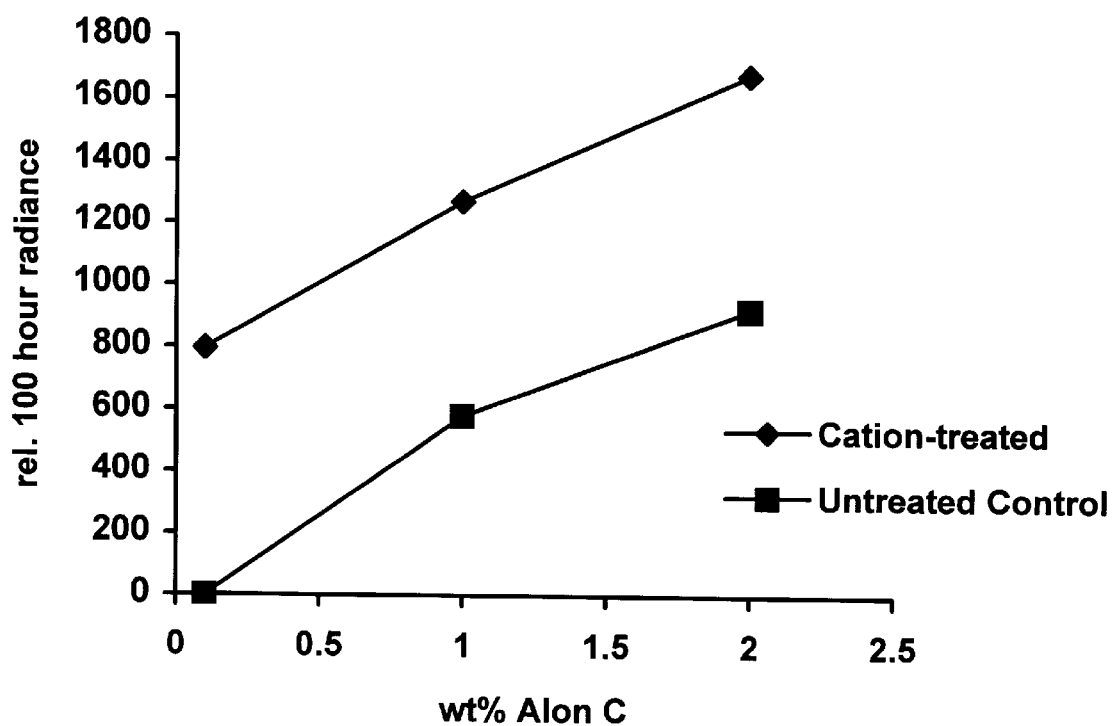
FIG. 3 is a graphical representation of the relative 100 hour radiance of fluorescent lamps incorporating a cation-treated $BaSi_2O_5$:Pb phosphor as a function of the amount of Alon C blended with the cation-treated phosphor.

A further improvement in maintenance is achieved when the cation treatment is combined with a small amount of a high surface area (about 100 m²/g) aluminum oxide powder such as Aluminum Oxide C (Alon C) available from Degussa AG. Referring to FIGS. 2 and 3, a Ba cation-treated $BaSi_2O_5:Pb$ phosphor was prepared as in Example 1 with the exception that the annealing was carried out at 900° C. for 7 hours. Various amounts of Alon C up to about 2 wt. % were dry-blended with the cation-treated phosphor and test lamps were made using the blended phosphor. The same amounts of Alon C were blended with untreated $BaSi_2O_5:Pb$ phosphor and test lamps were made for comparison. FIG. 2 shows the lamp maintenance as a function of the weight percent (wt %) of Alon C added to the phosphor blend. FIG. 3 shows the relative 100 hour radiance of the test lamps relative to a control lamp made with a blend of the untreated $BaSi_2O_5:Pb$ phosphor and 0.1 wt % Alon C. The data shown in FIGS. 2 and 3 demonstrate a consistent increase in 100 hour radiance and maintenance when Alon C is combined with the cation-treated phosphor.

Figure 4:
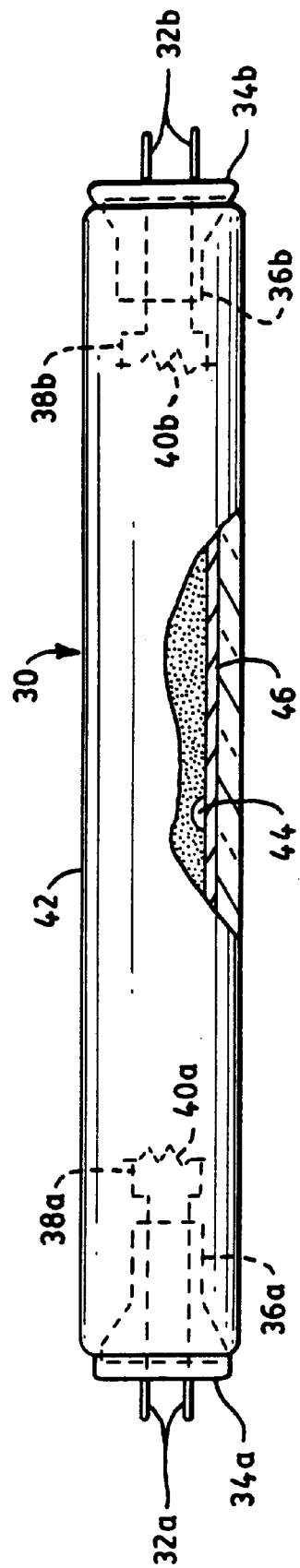
FIG. 4 is a diagram of a fluorescent lamp coated with the cation-treated phosphor of this invention.

FIG. 4 illustrates a fluorescent lamp 30 comprising a transparent, light-transmitting sealed envelope 42, preferably glass. The envelope 42 is fitted at each end with mounts comprising electrodes 40a and 40b, re-entrant stem presses 36a and 36b, and lead-in conductors 38a and 38b. Base caps 34a and 34b and pins 32a and 32b are provided at each end of envelope 42. A small charge of mercury 44 is contained within the envelope 42 to provide a partial vapor pressure of mercury. The inner surface of the envelope 42 is coated with phosphor layer 46 which includes the cation-treated phosphor of this invention.

While there has been shown and described what are at the present considered the preferred embodiments of the invention, it will be obvious to those skilled in the art that various changes and modifications may be made therein without departing from the scope of the invention as defined by the appended claims.

We claim:

1. A method for preparing a cation-treated silicate phosphor, comprising:

adding an amount of a silicate phosphor to a salt solution containing a cation, the ratio of cation to phosphor in the solution being from about 1:2 to about 4:1 moles of cation to moles of phosphor;

stirring the solution for a time sufficient to cause the cation to attach to the phosphor surface to form a cation-treated phosphor;

separating the cation-treated phosphor from the solution; and annealing the cation-treated phosphor at a temperature and for a time sufficient to increase radiance maintenance of the cation-treated phosphor.

2. The method of claim 1 wherein the silicate phosphor is $BaSi_2O_5$:Pb.

3. The method of claim 1 wherein the cation is barium or strontium.

4. The method of claim 3 wherein the salt solution is a solution of barium chloride or strontium nitrate.

5. The method of claim 1 wherein the cation-treated phosphor is annealed at a temperature from about 700° C. to about 1000° C. for about 2 hours to about 7 hours.

6. The method of claim 1 wherein the solution is stirred for at least about 60 minutes.

7. A method for preparing a cation-treated silicate phosphor, comprising:

adding an amount of a silicate phosphor to a salt solution containing a cation, the ratio of cation to phosphor in the solution being from about 1:2 to about 4:1 moles of cation to moles of phosphor;

stirring the solution for at least about 60 minutes to form a cation-treated phosphor;

separating the cation-treated phosphor from the solution; and annealing the cation-treated phosphor at a temperature from about 700° C. to about 1000° C. for about 2 hours to about 7 hours.

8. The method of claim 7 wherein the cation is barium or strontium.

9. The method of claim 8 wherein the silicate phosphor is $BaSi_2O_5$:Pb.

10. The method of claim 9 wherein the salt solution is a solution of barium chloride or strontium nitrate.

11. A fluorescent lamp having a phosphor layer containing a cation-treated $BaSi_2O_5$:Pb phosphor and having a maintenance of at least about 82%.

12. The fluorescent lamp of claim 11 wherein the phosphor layer contains a high surface area aluminum oxide.

13. The fluorescent lamp of claim 12 wherein the aluminum oxide comprises up to about 2 weight percent of the phosphor layer.

14. A fluorescent lamp having a phosphor layer containing a $BaSi_2O_5$:Pb phosphor having a cation-treatment, the fluorescent lamp having a maintenance which is at least about 4% greater than a similar fluorescent lamp having a phosphor layer containing the same $BaSi_2O_5$:Pb phosphor without the cation treatment.

15. The fluorescent lamp of claim 14 wherein the phosphor layer contains a high surface area aluminum oxide.

16. The fluorescent lamp of claim 15 wherein the aluminum oxide comprises up to about 2 weight percent of the phosphor layer.

17. The fluorescent lamp of claim 14 wherein the maintenance is at least about 8% greater than the similar fluorescent lamp containing the untreated phosphor.

18. The fluorescent lamp of claim 17 wherein the cation-treated phosphor has been treated with barium cations and the ratio of silicon to barium surface atoms is 3.0 or less.

19. The fluorescent lamp of claim 17 wherein the cation-treated phosphor has been treated with strontium atoms.

20. A cation-treated $BaSi_2O_5$:Pb phosphor comprising a $BaSi_2O_5$:Pb phosphor having a surface enriched in barium atoms whereby the ratio of silicon to barium surface atoms is 3.0 or less.

* * * * *